Patented Jan. 19, 1932

1,841,564

UNITED STATES PATENT OFFICE

ALEXANDER WINOGRADOW, OF NEW YORK, N. Y.

MANUFACTURE OF GLUED MATERIALS

No Drawing. Application filed September 24, 1929. Serial No. 394,932.

This invention relates to the manufacture of glued materials, and has particular reference to a novel composition of matter for glued materials, and to a novel process of producing the same.

There are many compositions of matter in use having glue as the binder. Common among these is a material having sawdust as the filler, and this invention relates chiefly to such a material. But it is to be understood, that I do not wish to limit myself to sawdust, other fillers can be used, such as rotten stone, asbestos, etc., and still come within the scope of the invention. The type of glue which is considered in this invention is immaterial so long as it is softened and obtains its tackiness by the absorption of water. Gum arabic, casein glue and the animal and vegetable glues in common use are examples.

The present method of manufacturing materials of the class to which this invention relates, is to mix the dampened filler and dry glue together, then place the mixture in a mold and subject it to pressure. Sometimes heat is used in addition to pressure. A defect of the present method is that the product requires considerable time to dry out. A further defect is that the product does not dry out uniformly, the outer portions drying before the inner. Because of this, it is subject to internal stress which induces warping and checking.

It is an object of the present invention to overcome these defects, and where an inflammable filler is used, such as sawdust, to render the product substantially fireproof. Under certain conditions as described hereinafter, the glue becomes waterproof.

In accordance with the present invention, the dry glue, ground or powdered, is mixed with a dry crystalline substance formed with water of crystallization in its crystals. Upon heating this mixture, the crystals give up their water of crystallization to the glue, causing it to become soft and tacky.

In the manufacture of any given glued material, the dry mixture of the glue and crystalline substance is intimately mixed with the proper proportion of the dry filler. This latter mixture is then placed in molds and subjected to heat and pressure. When the heat has dissipated, the molds are opened, and the dry and hard product is then available.

When the intimate mixture of the filler, the dry glue and the crystalline substance is heated, water from the crystals is everywhere, throughout every portion of the mass, made available to the glue, which in turn agglomerates and adheres to the filler, the addition of pressure facilitating these interactions. When the heat is dissipated, the crystals reform taking back their water and leave the agglomerated glue hard and dry, with the crystals and filler firmly embedded therein.

Thus it is seen that according to my invention, water is supplied uniformly throughout the mass, and drying is quickly consummated.

In effecting the present invention, many crystalline substances may be used to supply their water of crystallization to the glue. It is immaterial whether the crystals are water soluble or not. However, the melting point of the crystals, that is to say, the critical temperature at which they begin to give up their water, must be lower than one which would injure the particular glue to be used. Further, certain crystalline substances cannot be used with certain glues as they prevent the glue from becoming tacky. This may happen with certain glues when used for example, with crystalline sodium thiosulphate.

An example of a glue-crystal mixture, in which the melting point of the crystal is not too high and in which there is no interference with the tackiness of the glue, is one composed of gum arabic and crystalline sodium thiosulphate, $Na_2S_2O_3 \cdot 5H_2O$.

The proportion of the crystalline substance to the glue in general, is just enough of the former to condition the glue when subjected to heat and pressure, to agglomerate and to adhere properly to the filler. This proportion depends on the particular glue and crystalline substance and temperature used. The proportion of the glue-crystal mixture to the filler varies between wide limits. It depends on the filler used, the strength of the finished product desired and the voids present between the particles of the filler, as is well known in the art of glued materials.

The folowing proportions will give a workable glue-crystal mixture:—

Gum arabic, 10 parts by weight; crystalline sodium thiosulphate, 20 parts by weight.

Other crystalline substances, by way of example, which can be used to form glue-crystal mixtures in accordance with the present invention are:—

Crystalline sodium phosphate (secondary), $Na_2HPO_4 \cdot 12H_2O$; crystalline magnesium phosphate, $MgHPO_4 \cdot 7H_2O$; crystalline potassium alum, $K_2(SO_4)Al_2(SO_4)_3 \cdot 24H_2O$.

As an example of a complete glued material manufactured in accordance with the present invention, a mixture of gum arabic, 10 grams, crystalline sodium thiosulphate, 20 grams, and very fine mahogany sawdust, 20 grams, is placed in a mold and subjected to pressure and heat from 50 to 60 C. for about half an hour. The melting-point of crystalline sodium thiosulphate, it is to be noted, is 48.2 C. When the mixture cools it will be found to be dry and hard.

A glue-crystal mixture formed of animal glue and potassium alum becomes insoluble in time, even though the alum itself is water soluble, as the alum tans the glue to form a water insoluble compound. When this glue-crystal mixture is combined with sawdust to form a glued material, in accordance with this invention, a substantially waterproof product is obtained.

Magnesium phosphate is practically water insoluble and a glued product formed with it will resist the action of water better than one formed with sodium thiosulphate.

Glued products made in accordance with my invention are fireproofed even if an inflammable filler as sawdust is used. It is the presence of the crystalline substance that effects the fireproofing.

It is a feature of my invention that quicker results are obtained when the glue-crystal mixture is heated substantially above the melting point of the crystal as noted above in connection with sodium thiosulphate.

I claim:—

1. The process of manufacturing glued materials consisting in subjecting a mixture of dry glue, a crystalline substance having water of crystallization in its crystals and a melting point lower than a temperature which would deteriorate the glue, and a dry filler, to heat and pressure.

2. The process of making dry glue soft and tacky consisting in supplying water to the glue from crystalline substances, having water of crystallization in their crystals and melting points lower than a temperature which would deteriorate the glue, in the presence of heat.

3. The process of making dry powdered glue soft and tacky consisting in mixing the glue with a crystalline substance having water of crystallization in its crystals and a melting point lower than a temperature which would deteriorate the glue, and then heating the mixture to free said water from the crystals and supply it to the glue.

4. The process of manufacturing glued materials consisting in subjecting a mixture of a dry filler, dry glue, and a crystalline substance, formed with water of crystallization in its crystals and having a melting point lower than a temperature which would deteriorate the glue, to pressure and to heat until the water of crystallization leaves the crystals and is taken up by the glue.

5. The process of manufacturing glued materials consisting in subjecting a mixture of a dry filler, dry powdered glue, and a crystalline substance formed with water of crystallization in its crystals and having a melting point lower than a temperature which would deteriorate the glue, to pressure and to heat until the water of crystallization leaves the crystals and is taken up by the glue, causing the glue to adhere to the filler, and then allowing the mixture to cool until the crystals reform by taking back their water and leave the glue dry and hard.

6. The process of agglomerating dry powdered glue consisting in supplying water of crystallization to the glue from a crystalline substance by heating said substance formed with water of crystallization in its crystals and having a melting point substantially lower than a temperature which would deteriorate the glue, in the presence of the glue, substantially above the melting point of said substance.

7. The process of manufacturing glued materials consisting in subjecting a mixture of a dry filler, dry glue, and a crystalline substance formed with water of crystallization in its crystals and having a melting point lower than a temperature which would deteriorate the glue, to pressure and to heat until the water of crystallization leaves the crystals and is taken up by the glue, the proportion of the crystalline substance to the glue being such that sufficient water is supplied to the glue to cause it to agglomerate and adhere to the filler, and then allowing the mixture to cool until the crystals reform by taking back their water.

8. The process of manufacturing fireproofed glued material consisting in adding a crystalline substance formed with water of crystallization in its crystals and having a melting point lower than a temperature which would deteriorate the glue to a mixture of a dry filler and dry powdered glue, then applying pressure and heat until the water of crystallization leaves the crystals and is taken up by the glue, and then allowing the mixture to cool until the crystals reform by taking back their water, leaving the glue dry and hard and with crystals distributed throughout its mass, the presence of the crystals fireproofing the material.

9. A composition of matter for forming glued material without the addition of water, consisting of a dry filler, dry glue, and a crystalline substance having water of crystallization in its crystals and a melting point lower than a temperature which would deteriorate the glue.

10. A composition of matter for forming glued material without the addition of water, consisting of a dry filler, dry glue, and a crystalline substance having water of crystallization in its crystals and a melting point lower than a temperature which would deteriorate the glue, the quantity of crystalline substance present when melted being sufficient to furnish enough water to condition the glue for binding.

11. A composition of matter for forming fireproofed glued sawdust material with crystals distributed throughout its mass, consisting of dry sawdust, dry glue, and a crystalline substance having water of crystallization in its crystals and a melting point lower than a temperature which would deteriorate the glue.

12. A composition of matter for forming glued material without the addition of water, consisting of a dry filler, dry glue, and a crystalline substance having water of crystallization in its crystals and a melting point lower than a temperature which would deteriorate the glue, the chemical character of said substance being such as to leave unaffected the tackiness of the glue.

13. A composition of matter for forming waterproof glued sawdust material without the addition of water consisting of dry sawdust, dry animal glue, and crystalline potassium alum.

14. The process of manufacturing waterproof glued material consisting in subjecting a mixture of dry animal glue, crystalline potassium alum and a dry filler to pressure and to heat until the water of crystallization leaves the crystals and is taken up by the glue, causing the glue to agglomerate and adhere to the filler, the alum further acting to tan the glue and render it waterproof.

15. A composition of matter for forming glued material without the addition of water consisting of a mixture of a dry filler, dry gum arabic and crystalline sodium thiosulphate.

16. A composition of matter for forming glued material without the addition of water consisting of a mixture of a dry filler, dry powdered glue and crystalline sodium phosphate (secondary).

ALEXANDER WINOGRADOW.